United States Patent
Zacchio et al.

(10) Patent No.: US 9,898,065 B2
(45) Date of Patent: Feb. 20, 2018

(54) WAKE-UP CIRCUIT FOR A SECURITY DEVICE

(75) Inventors: Joseph Zacchio, Wethersfield, CT (US); Vijaya Ramaraju Lakamraju, Longmeadow, MA (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 856 days.

(21) Appl. No.: 13/991,275

(22) PCT Filed: Dec. 9, 2010

(86) PCT No.: PCT/US2010/059663
§ 371 (c)(1),
(2), (4) Date: Jun. 3, 2013

(87) PCT Pub. No.: WO2012/078158
PCT Pub. Date: Jun. 14, 2012

(65) Prior Publication Data
US 2013/0254574 A1 Sep. 26, 2013

(51) Int. Cl.
*G06F 1/00* (2006.01)
*G06F 1/32* (2006.01)
(Continued)

(52) U.S. Cl.
CPC ...... *G06F 1/3234* (2013.01); *H04W 52/0229* (2013.01); *G07C 9/00309* (2013.01); *Y02B 60/50* (2013.01)

(58) Field of Classification Search
CPC ............. G06F 1/3234; G07C 9/00309; H04W 52/0229; Y02B 60/50
See application file for complete search history.

(56) References Cited

U.S. PATENT DOCUMENTS 5,099,227 A * 3/1992 Geiszler ............... G06K 7/0008
235/440
6,535,136 B1 * 3/2003 Rodenbeck et al. ....... 340/686.6
(Continued)

FOREIGN PATENT DOCUMENTS

| CN | 101231685 A | 7/2008 |
| GB | 2187916 A | 9/1987 |

(Continued)

OTHER PUBLICATIONS

International Search Report and Written Opinion of the International Searching Authority for International Application No. PCT/US2010/059663 dated Aug. 31, 2011.
(Continued)

*Primary Examiner* — Jaweed A Abbaszadeh
*Assistant Examiner* — Gayathri Sampath
(74) *Attorney, Agent, or Firm* — Carlson, Gaskey & Olds

(57) ABSTRACT

An exemplary security device includes a reader configured to read information stored on a credential device. The reader enters a sleep mode when not reading a credential device. A wake-up module includes an inductively coupled resonant circuit. The wake-up module is configured to detect a credential device near the reader if the credential device has a resonant frequency corresponding to a frequency of an electromagnetic field of the inductively coupled resonant circuit that is controlled by a stable oscillator. The wake-up module is configured to provide an indication to wake-up the reader from the sleep mode responsive to detecting a change in power of the electromagnetic field caused by the credential device.

13 Claims, 4 Drawing Sheets

(51) Int. Cl.
*H04W 52/02* (2009.01)
*G07C 9/00* (2006.01)

(56) References Cited

U.S. PATENT DOCUMENTS

| | | | |
|---|---|---|---|
| 7,205,775 | B2 | 4/2007 | Kreit |
| 7,298,137 | B2 | 11/2007 | Howard et al. |
| 7,514,919 | B2 | 4/2009 | James et al. |
| 7,696,873 | B2 | 4/2010 | Sharma et al. |
| 2003/0006879 | A1 | 1/2003 | Kang et al. |
| 2006/0170553 | A1* | 8/2006 | Bierach ............... 340/572.4 |
| 2007/0236336 | A1* | 10/2007 | Borcherding ........ G06K 7/0008 340/10.34 |
| 2008/0039137 | A1* | 2/2008 | Saegrov ............. G06K 7/10178 455/558 |
| 2009/0184825 | A1* | 7/2009 | Anderson ............ G06Q 10/087 340/572.1 |
| 2010/0060428 | A1* | 3/2010 | Lee et al. ................. 340/10.1 |
| 2010/0144269 | A1 | 6/2010 | Do et al. |

FOREIGN PATENT DOCUMENTS

| | | | |
|---|---|---|---|
| JP | 2001032584 A | 2/2001 | |
| JP | 2001184467 A | 7/2001 | |
| KR | 1020040091952 | 11/2004 | |
| KR | 100516968 | 9/2005 | |
| KR | 100567809 B1 * | 4/2006 | ............ G06K 17/00 |
| KR | 2020100009209 | 9/2010 | |

OTHER PUBLICATIONS

International Preliminary Report on Patentability for International application No. PCT/US2010/059663 dated Jun. 20, 2013.
State Intellectual Property Office of People's Republic China, First Search, Application No. 201080070577.X dated Oct. 11, 2014.
Extended European Search Report for Application No. EP 10 86 0473 dated Nov. 8, 2017.

* cited by examiner

US 9,898,065 B2

WAKE-UP CIRCUIT FOR A SECURITY DEVICE

BACKGROUND

Security devices are used for a variety of applications. For example, security devices control access to secured areas by automating the control over door locks. This is useful in a variety of situations, such as hotels in which the security device is part of a hotel room door lock. A card reader positioned near or on the door determines whether a card presented by an individual has appropriate information stored on it to allow access through that door. Upon detecting an appropriate, authorized card, the security device automatically unlocks the door, for example.

A variety of such devices are known and in widespread use. Those skilled in the art have been striving to reduce power consumption by security devices. It has been proposed, for example, to use low power circuitry within security devices.

It has been found desirable to allow such devices to enter a sleep mode in which the devices consume minimal power. One approach at providing a wake-up function includes a capacitive wake-up circuit. One shortcoming of such an arrangement is that any object that appears to be capacitive to the wake-up circuit results in unnecessarily waking up the security device such that it consumes power for at least some time. Waking up the security device more often than necessary undesirably consumes additional power.

SUMMARY

An exemplary security device includes a reader configured to read information stored on a credential device. The reader enters a sleep mode when not reading a credential device. A wake-up module includes an inductively coupled resonant circuit. The wake-up module is configured to detect a credential device near the reader if the credential device has a resonant frequency corresponding to a frequency of an electromagnetic field of the inductively coupled resonant circuit that is controlled by a stable oscillator. The wake-up module is configured to provide an indication to wake-up the reader from the sleep mode responsive to detecting a change in power of the electromagnetic field caused by the credential device.

An exemplary method of controlling a security device includes selectively putting a reader, which is configured to read information stored on a credential device having a resonant frequency corresponding to a frequency of an electromagnetic field of an inductively coupled resonant circuit of the security device, into a sleep mode when not reading credential information or determining whether read information is valid. A determination whether a credential device is near the reader is made by determining a change in power of the electromagnetic field caused by the credential device. The reader is woken from the sleep mode responsive to detecting the change in power.

The various features and advantages of this invention will become apparent to those skilled in the art from the following detailed description. The drawings that accompany the detailed description can be briefly described as follows.

DETAILED DESCRIPTION

Figure 1:
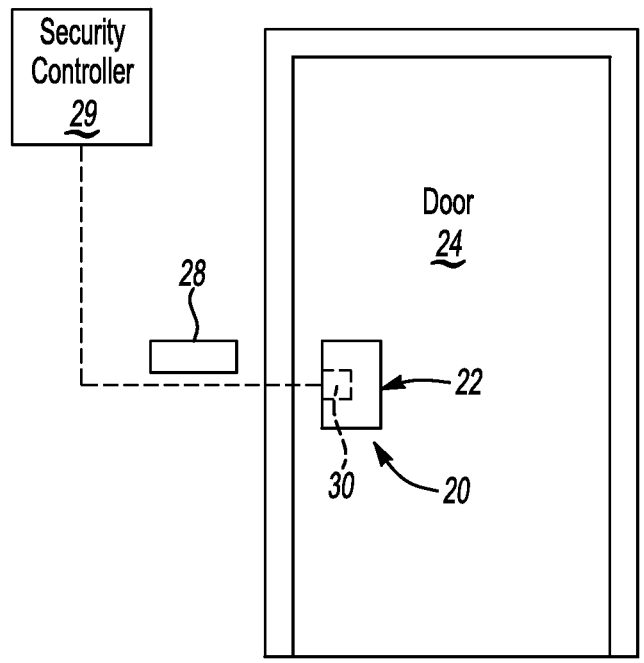
FIG. 1 diagrammatically illustrates one example security device including a wake-up module designed according to an embodiment of this invention.
Figure 2:
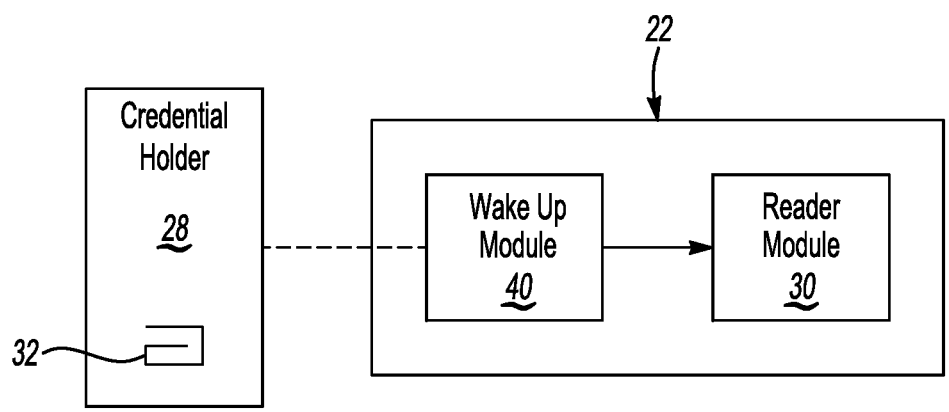
FIG. 2 schematically illustrates selected portions of an example security device.

FIGS. 1 and 2 illustrate an example security device 20, which in this example comprises a door lock 22 for controlling whether a door 24 can be opened. In this example, the door lock 22 includes a reader module 30 configured to receive credential information from a credential device 28. In one example, the credential device 28 comprises a proximity credential including a microchip with an inductively coupled circuit or coil 32. There are known proximity credential devices. The illustrated example credential device 28 comprises a card that an individual can carry.

Information stored on the credential device 28 can be detected and analyzed by the security device 20. In the illustrated example, that information is analyzed by a remotely located security system controller 29 to determine whether the desired access should be given (i.e., to unlock the door 24). The security device 20 may take a different form other than a door lock. The credential device 28 also may take a variety of forms. Given this description, those skilled in the art will realize that a door lock and a card are merely examples of potential embodiments.

As shown in FIG. 2, the door lock 22 includes a reader module 30 that reads the information stored on the credential device 28. In this example, the credential device 28 includes information regarding the credentials or authorization of the individual having that credential device. The reader module 30 is configured, programmed or both to facilitate determining whether the credential information of the credential device 28 is valid. The actual determination may be made by the security system controller 29 in a known manner. When valid credential information is presented, the door lock 22 automatically operates to grant access through the door 24.

The example reader module 30 has two operating modes. One is considered an active reading mode during which the reader module is being used for gathering the credential information from the credential device 28. Given that the reader module 30 will not be used in the active reading mode a majority of the time, this example includes a minimum power consumption mode (e.g., a sleep mode) during which the reader module 30 consumes a minimal amount of power. This provides an energy savings feature.

The example of FIG. 2 includes a wake-up module 40 that wakes up the reader module 30 so that it will change from the sleep mode into the active reading mode whenever it is necessary to make a determination regarding the credential information on a presented credential device 28. The wake-up module 40 detects the presence of a credential device 28 and provides a signal to wake-up the reader module 30.

Figure 3:
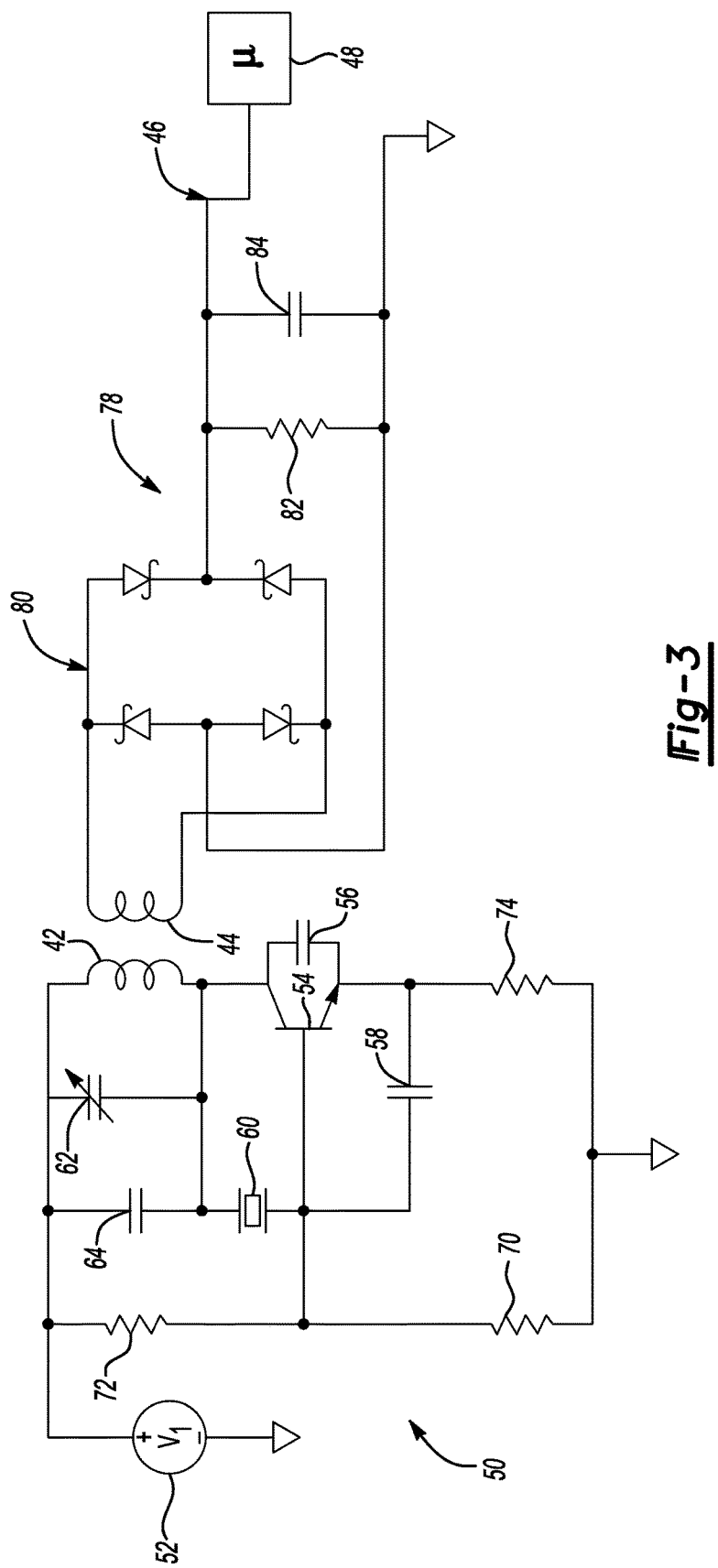
FIG. 3 schematically illustrates an example wake-up module.

An example embodiment of a wake-up module 40 is shown in FIG. 3. This example includes a stable oscillator with a resonant circuit for inductively detecting the presence of a credential device 28 in close proximity to the security device 20. This example includes using a generated resonant field and sensing the field power absorbed by the coil 32 on the credential device 28 as the credential device 28 approaches the security device 20.

In this particular example, the inductively coupled resonant circuit of the wake up module 40 comprises a first coil 42 and a second, field sensing coil 44. In one example, the coils 42 and 44 are PC foil coils, which allows for realizing a small wake up module that can fit within tight packaging constraints. The example shown in FIGS. 4a and 4b includes the first coil 42 on one side of a printed circuit board 45 and the second coil 44 on an opposite side of the board 45. In another example, the coils comprise interleaved PC foil coils. Other examples include one of the coils surrounding or encompassing the other.

The first coil 42 generates an electromagnetic field. The frequency of the electromagnetic field is selected to correspond to a resonant frequency of the coil 32 of the credential device 28 so that an inductive coupling is effectively established between the first coil 42 and the inductive loop 32 of the credential device 28 as the credential device 28 approaches the security device 20. When this occurs, the coil 44 senses that the field of the coil 42 has been partially absorbed and the wake-up module 40 provides an indication to wake up the reader module 30. That results in the reader module 30 waking up from the minimal power consumption mode to switch into the active reading mode used for analyzing whether appropriate credential information is presented on the credential device 28 when an individual desires to open the door 24.

One feature of the illustrated example is that it avoids unnecessarily waking up the reader module 30 because any object that seems capacitive near such a wake-up circuit falsely causes the device to wake-up and results in consuming unnecessary power. The inductively coupled resonant field technique of the illustrated example, on the other hand, will only provide a wake-up indication when an appropriately designed credential device 28 is presented in near proximity to the wake-up module 40.

Having the inductive coupling occur when the resonance of the coil 32 of the credential device 28 corresponds to the resonant frequency of the resonant circuit of the wake up module 40 allows for some difference between the resonant frequencies. For example, the resonant frequency of the coil 32 may equal that of the coil 42 or there may be some variation between the two frequencies. Provided that there is sufficient correspondence between them, there will be sufficient absorption of power of the electromagnetic field of the coil 42 to provide an indication to wake up the reader module 30.

As shown in FIG. 3, the second coil 44 is associated with the first coil 42. In the presence of a credential device 28, the power of the electromagnetic field of the coil 42 drops and this is detected by the second coil 44 and associated circuitry. An output at 46 drops from a first magnitude when no credential device 28 is present to a second, lower magnitude when some of the power of the field of the coil 42 is absorbed by a resonant credential device 28. The output at 46 is provided to a controller 48 that causes the reader module 30 to wake-up and enter the active reading mode.

The decrease in the output at 46 can be any amount that is discernable for purposes of serving as an indication to wake up the reader module 30. In one example, the magnitude of the output at 46 decreases by about 50% when the power of the field of the coil 42 is at least partially absorbed by the resonant credential device 28. In other words, the first magnitude of the output at 46 when no credential device is present is approximately twice the second magnitude of the output at 46 when a resonant credential device 28 at least partially absorbs power from the field of the coil 42.

In another example, the output at 46 decreases by about 80% so that the second magnitude is approximately one-fifth the first magnitude. In one such example, the output at 46 is approximately 1 volt when no credential device 28 is being detected. When a credential device 28 is present, the output at 46 drops to approximately 0.2 volts. That change in the output at 46 provides the indication to wake up the reader module 30 for reading the credential information from the credential device 28 that has been detected.

In the example of FIG. 3, a proximity oscillator circuit 50 controls the power and frequency of the electromagnetic field provided by the first coil 42. The oscillator circuit 50 is stable so that its frequency does not change when a credential device is near enough to be detected. The stable oscillator allows for detecting a change in the load of the inductive circuit as power is absorbed by the coil of the credential device.

The oscillator circuit in one example operates consistent with the operation of known solid state oscillators with ceramic resonator frequency control. One example includes a Colpitts oscillator. Another example includes a Pierce oscillator. This example includes a power source 52 provided by a microprocessor associated with the reader module 30. In one example, the voltage of the power source 52 is between 0.9 and 1.8 volts. The example power source 52 is, therefore, low-power battery capable.

The oscillator circuitry 50 includes a transistor 54 and capacitors 56, 58, 62 and 64. A ceramic resonator 60 allows for a faster startup speed for the wake-up module 40. Ceramic resonators have a much faster ramp up time compared to quartz resonators, for example, in such an oscillator design. One example includes turning the wake-up module 40 on for approximately 100 milliseconds to 500 milliseconds at a time, depending on the response time requirement of a particular example. The wake-up module 40 is then off for a selected time that may be on the order of 100 to 1000 milliseconds. A fast start-up speed is required to achieve credential device detection during a short on-time window. Using a ceramic resonator 60 provides that functionality.

In one example, the capacitor 56 has a 22 pF capacitance and the capacitor 58 has a 33 pF capacitance. The capacitor 62 can be selectively tuned and has a capacitance between 6.8 and 40 pF. The capacitor 62 is tuned to the resonance that provides the best detector output level. The capacitor 64 in this example has a 22 pF capacitance. In one such example, a resistor 70 has a 27 KOhm resistance, a resistor 72 has a 3.9 KOhm resistance and a resistor 74 has an 820 Ohm resistance. In one such example, the first coil 42 has a 1.8 uHenry inductance with an Rac value of about 4 ohms. The second coil 44 has a 1.65 uHenry inductance and an Rac value of about 7 ohms. In one example, those circuitry values provide a 13.56 MHz oscillator. With a 2 volt supply from the power source 52, the example circuitry utilizes 1.02 milliamps when no credential device 28 is present and the output at 46 is approximately 950 millivolts. When a resonant credential device 28 is within about 20 millimeters of the first coil 42, the output at 46 drops to approximately 475 millivolts, which results in waking up the reader module 30.

Another example includes using a 16 MHz resonator. In such an example, the capacitor 64 is removed from the illustrated example circuitry. The capacitor 62 is tuned to the resonance that provides the best detector output level.

The example of FIG. 3 includes proximity detector output circuitry 78 for controlling the output 46 that is provided for waking up the reader module 30. This example includes a Schottky diode bridge circuit 80, a resistor 82 having a 100 KOhm resistance and a capacitor 84 having a 470 pF capacitance. The example arrangement allows for providing the output 46 to an A/D input of the microcontroller 48, which is associated with the reader module 30.

One feature of the illustrated example is that it allows for discriminating credential device detection because of the selective tuning of the resonator of the wake-up module 40 so that an inductive field coupling with an appropriate credential device that results in a discernable change in power or load is achieved. One example provides an ability to detect a variety of credential devices having different resonant frequencies of their respective coils 32. This feature allows for accommodating a variety of credential devices or variations among credential devices with a single detection circuit (i.e., a single coil 42) for the wake up module 40.

In one such example a single wake-up detection circuit arrangement can be controlled to change the resonant frequency of the electromagnetic field for detecting the presence of a credential device 28. For example, a ceramic resonator that can be driven differently provides an ability to drive the detection circuitry in a manner that renders it capable of detecting different resonant frequencies of different credential devices. One example includes using different oscillators for driving the circuitry differently to detect a plurality of credential device frequencies of interest. Another example uses different resonators for achieving the different detection frequencies. One example includes cycling through a selected plurality of frequencies each time the wake up module 40 is active.

In examples that utilize different resonant frequencies, the oscillator circuit 50 is stable at each of the selected frequencies. In other words, the change from one frequency to another is controlled by the wake up module 40 and is not a change in frequency based on the presence of another inductive device in the vicinity of the detector.

Another feature of the illustrated example is that it allows for detecting the credential device 28 only when that is in very close proximity to the wake-up module 40. For example, a distance of approximately 20 millimeters between the first coil 42 and the credential device 28 allows for a sufficient inductive coupling to provide an output at 46 that wakes up the reader module 30. In most embodiments, the range of the wake up module 40 (i.e., the distance between the wake up module 40 and the credential device 28 required for detection) is selected to be consistent with a credential device 28 being very close to or intentionally approaching the security device 20 in a manner consistent with an attempt to have the reader module 30 read the credential information on the credential device 28. In other words, an individual having a resonant credential device 28 that is merely passing by the security device 20 will not normally result in the wake-up module 40 detecting the credential device 28 under those circumstances. Only an individual intentionally placing the credential device 28 within the detecting range of the security device 20 consistent with an imminent attempted access to the secured area results in waking up the reader module 30. This feature allows for consuming less power by further avoiding false wake-ups.

Figure 4A:
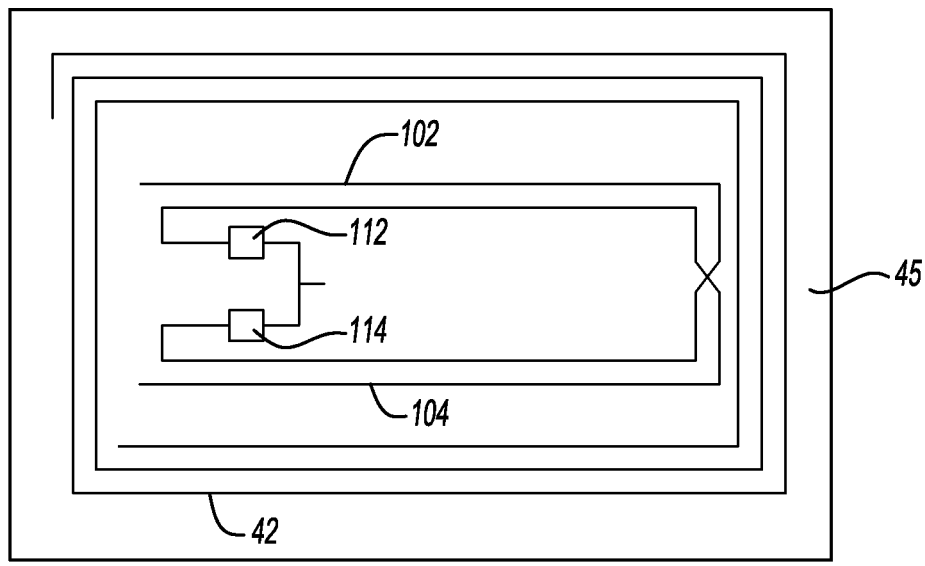
FIGS. 4a and 4b schematically illustrate opposite sides of a printed circuit board of an example embodiment.
Figure 4B:
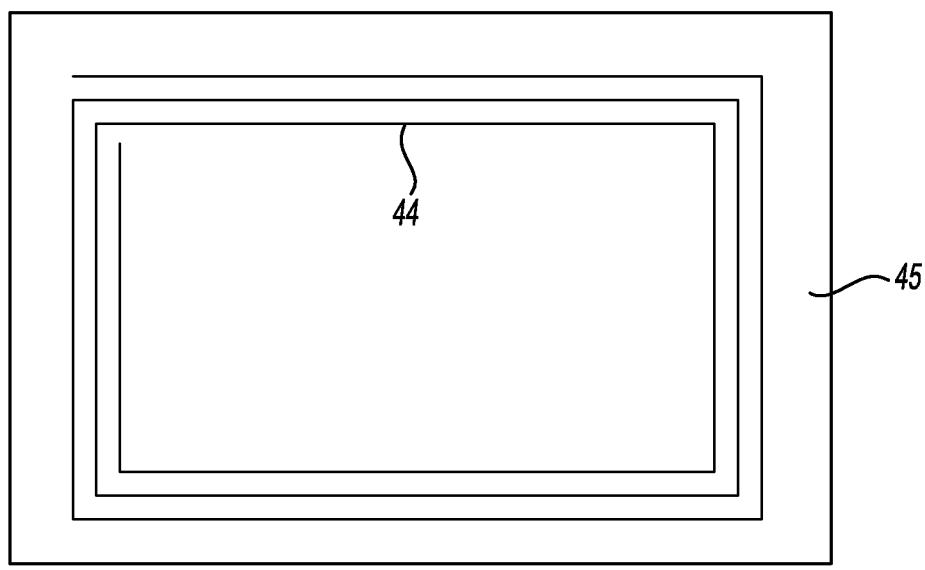

FIGS. 4a and 4b schematically illustrate one arrangement of the coils 42 and 44 on a single printed circuit board 45. In this example, the first coil 42 is on one side of the board 45 (shown in FIG. 4a) and the second coil 44 is on an oppositely facing side of the board 45 (shown in FIG. 4b). This is one example arrangement of the coils that allows for a compact design.

The example board 45 also supports reader coils 102 and 104 that are used by the reader module 30 for detecting the credential information from the proximity credential device 28. The reader coils are supported on the same side of the board 45 as the first coil 42 in this example.

One feature of the illustrated example is that power consumption is kept to a minimum as much as possible. For example, the current for the oscillator is kept below approximately 1 milliamp, resulting in a total power for coil 42 of about 1 milliwat. Only turning on the reader module 30 when discernment of credential information is needed saves power. The wake up module 40 on the other hand is turned on more frequently to allow for detecting a credential device 28 within the desired proximity of the security device 20. The wake up module 40 is not constantly on in this example. Given that the reader module 30 is turned on much less often, the reader coils 102 and 104 have a higher field and power level applied to them. In one example, the coils 102 and 104 are smaller than the first coil 42 and smaller than the second coil 44. In this example, the second coil 44, which is used for detecting the presence of a credential device 28, is the same size as the first coil 42, which provides the resonant electromagnetic field that is disturbed or absorbed by the resonant loop 32 of a credential device 28 in close enough proximity to the wake up module 40. In another example, the second coil 44 is larger than the first coil 42. The second coil 44 is kept large enough to provide the desired level of detection sensitivity for the wake up module. Given this description those skilled in the art will be able to select appropriate coil sizes to meet their particular needs.

Figure 5:
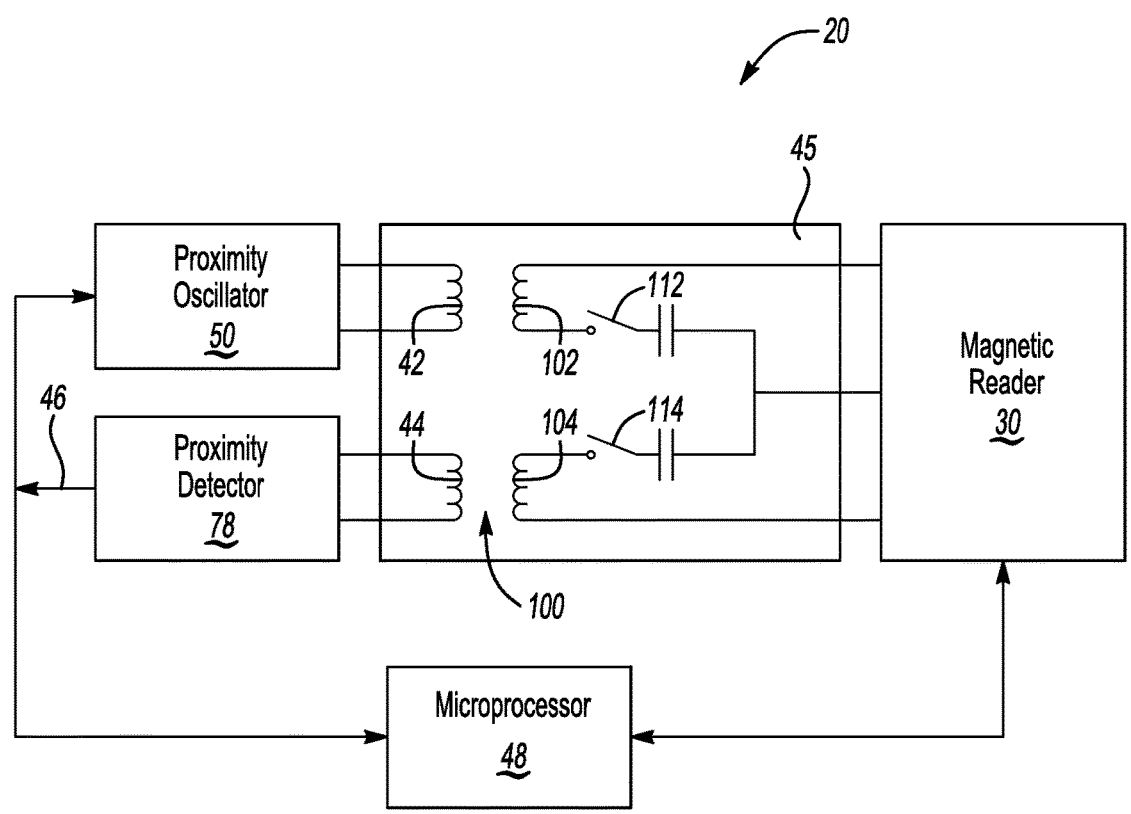
FIG. 5 schematically illustrates selected features of an example embodiment.

One aspect of the illustrated example is that such an arrangement of the coils introduces the possibility for the reader coils 102, 104 to absorb the magnetic field of the coil 42 in a manner that would render the wake up feature useless. FIG. 5 illustrates another feature of the example embodiment that addresses this situation. The microprocessor 48 controls switches 112 and 114 simultaneously switch the low side of the coils 102 and 104 off or on. Whenever the reader module 30 is active for reading credential information, the reader coils 102, 104 are turned on. Whenever the wake up module 40 is active and current is supplied to the coil 42, the coils 102, 104 are turned off. In this example, the controller 48 receives an indication from the proximity detection circuitry 78 on the output 46 and responsively wakes up the reader module 30 and activates the switches 112 and 114 to provide power to the coils 102 and 104. In one example, whenever the reader module 30 is in the sleep mode, the coils 102, 104 are turned off to avoid any interference with the ability to detect the presence of a credential device 28.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A security device, comprising:
a reader configured to read information stored on a credential device in a first operating mode, the reader entering a second, sleep mode in which the reader consumes less power than in the first operating mode, the reader entering the sleep mode after a predetermined period of inactivity wherein the reader is not reading a credential device or determining whether read information is valid; and
a wake up module comprising an inductively coupled resonant circuit, the wake up module being configured to (i) detect a credential device near the reader if the credential device has a resonant frequency corresponding to a frequency of an electromagnetic field of the inductively coupled resonant circuit that is controlled by a stable oscillator circuit and (ii) provide an indication to wake up the reader from the sleep mode responsive to detecting a change of power in the electromagnetic field of the inductively coupled resonant circuit caused by the credential device;

wherein the wake up module comprises first and second coils, the first coil providing an electromagnetic held and the second coil detecting when a credential device absorbs some of the electromagnetic field;

wherein the first and second coils are supported on a single board; and wherein the first coil is on one side of the board and the second coil is on a second, oppositely facing side of the board.

2. The security device of claim 1, wherein the first and second coils comprise PC foil coils.

3. The security device of claim 1, comprising
a reader coil that is configured for receiving credential information from a credential device and wherein the second coif is larger than the first coil and the first coil is larger than the reader coil.

4. The security device of claim 3, comprising
a switch that is controlled to selectively provide power to the reader coil and wherein the switch disconnects the reader coil from power when the wake up module is active for detecting a credential device near the device.

5. The security device of claim 1, wherein the inductively coupled resonant circuit is configured to selectively produce each of a plurality of electromagnetic fields for detecting credential devices of respectively different resonant frequencies.

6. The security device of claim 1, wherein the wake up module comprises an indicator that is associated with the inductively coupled resonant circuit, the indicator producing a voltage output corresponding to the electromagnetic field of the inductively coupled resonant circuit being at least partially absorbed by the credential device.

7. The security device of claim 6, wherein the voltage output of the indicator has a first magnitude if no credential device is near the reader and a second, lower magnitude responsive to the wake up module detecting the credential device.

8. The security device of claim 7, wherein the first magnitude is approximately twice the second magnitude.

9. The security device of claim 7, wherein the first magnitude is approximately five times as large as the second magnitude.

10. The security device of claim 1, wherein the inductively coupled resonant circuit comprises a solid state oscillator that provides ceramic resonator control over the electromagnetic field of the inductively coupled resonant circuit.

11. The security device of claim 10, wherein the oscillator comprises a ceramic resonator.

12. The security device of claim 1, wherein the wake up module detects a credential device when the resonant frequency corresponds to the frequency of the electromagnetic field of the inductively coupled resonant circuit within a selected range.

13. The security device of claim 1, wherein the wake up module detects a credential device when the resonant frequency approximately equals the frequency of the electromagnetic field of the inductively coupled resonant circuit.

* * * * *

UNITED STATES PATENT AND TRADEMARK OFFICE
CERTIFICATE OF CORRECTION

PATENT NO. : 9,898,065 B2
APPLICATION NO. : 13/991275
DATED : February 20, 2018
INVENTOR(S) : Joseph Zacchio and Vijaya Ramaraju Lakamraju It is certified that error appears in the above-identified patent and that said Letters Patent is hereby corrected as shown below:

In the Claims

In Claim 3, Column 7, Line 24; replace "second coif" with --second coil--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*